United States Patent [19]

Ishizuka et al.

[11] Patent Number: 5,026,985
[45] Date of Patent: Jun. 25, 1991

[54] METHOD AND APPARATUS FOR DETECTING A REFERENCE POSITION OF A ROTATING SCALE WITH TWO SENSORS

[75] Inventors: Koh Ishizuka, Urawa; Tetsuharu Nishimura, Kawasaki; Masaaki Tsukiji; Satoshi Ishii, both of Tokyo, all of Japan

[73] Assignee: Canon Kabushiki Kaisha, Tokyo, Japan

[21] Appl. No.: 409,796

[22] Filed: Sep. 20, 1989

[30] Foreign Application Priority Data

Sep. 30, 1988 [JP] Japan .................. 63-246650

[51] Int. Cl.⁵ ............................................ G01D 5/34
[52] U.S. Cl. ........................ 250/231.16; 250/237 G
[58] Field of Search ................ 250/227, 231 R, 221, 250/229, 231.16, 237 G; 33/707

[56] References Cited

U.S. PATENT DOCUMENTS

| | | |
|---|---|---|
| 3,728,551 | 4/1973 | Culver et al. . |
| 4,064,435 | 12/1977 | Stebbins . |
| 4,145,608 | 3/1979 | Shirasaki et al. .............. 250/237 G |
| 4,477,189 | 10/1984 | Ernst ................................ 33/707 |
| 4,868,385 | 9/1989 | Nishimura ................ 250/237 G |

FOREIGN PATENT DOCUMENTS

| | | |
|---|---|---|
| 303008 | 2/1989 | European Pat. Off. . |
| 61-212728 | 2/1987 | Japan . |
| 62-200223 | 2/1988 | Japan . |
| 997405 | 12/1961 | United Kingdom . |
| 1527514 | 10/1978 | United Kingdom . |
| 2149096 | 6/1985 | United Kingdom . |

OTHER PUBLICATIONS

Navy Technical Disclosure Bulletin, vol. 3, No. 7, published Jul., 1978, Arnolds Jansons, pp. 51–54.

Primary Examiner—David C. Nelms
Assistant Examiner—Que Tan Le
Attorney, Agent, or Firm—Fitzpatrick, Cella, Harper & Scinto

[57] ABSTRACT

In the reference-position detection method and apparatus for detecting a reference position of a scale, first and second patterns are disposed on the scale so that respective detection timings shift inversely to each other in response to a deviation in attitude of the scale. The first and second patterns are detected with timings different from each other by corresponding first and second sensors, and the reference position of the scale is determined according to outputs of respective sensors. Hence, even if the attitude of the scale changes from a predetermined attitude due to an inclination of the scale or a deviation in position of the scale, it is possible to exactly detect the reference position of the scale. Accordingly, it becomes also possible to increase the performance of a displacement measuring apparatus.

30 Claims, 5 Drawing Sheets

METHOD AND APPARATUS FOR DETECTING A REFERENCE POSITION OF A ROTATING SCALE WITH TWO SENSORS

BACKGROUND OF THE INVENTION

1. Field of the Invention

This invention relates to a method and an apparatus for detecting a reference position of a rotating scale, and more particularly, to a method and an apparatus for detecting a reference position used for a rotary encoder for reading the displacement of a grating formed along the circumferential direction of a rotating scale.

Heretofore, as a measuring instrument which can measure the displacement of an object to be measured in the unit of submicrometers, there has been known an optical encoder in which a laser beam is irradiated on a diffraction grating (scale) linked to an object to be measured, an interference light is formed by superimposing a pair of diffracted lights produced by the diffraction grating with each other, and the displacement of the diffraction grating, that is, the displacement of the object to be measured is measured according to a signal obtained by photoelectrically converting the interference light.

The present applicant has disclosed a method for detecting a reference position (an origin) of a scale in this kind of encoder in Japanese Patent Public Disclosure (Kokai) No. 62-200223 (1987). In the method disclosed by this publication, a mark for detecting a reference position formed on a scale is optically detected, and the reference position of the scale is detected with a very high resolution. Although this method can be applied to a linear scale and a rotary scale, our investigations show that problems sometimes arise, especially when this method is applied to a rotary scale mounted to a small rotating mechanism.

In the method disclosed by the above-described publication, a mark, or marks, consisting of a rectangular reflective film is, for example, provided on a rotating scale, and a rectangular or an elliptic beam spot extended in the direction of the radius of the scale is formed on the scale by irradiating a laser beam on the scale. A reflected light beam produced when the mark crosses the beam spot is then detected by two photosensors disposed in different positions so that detection timings for the reflected light beam are different to each other, levels of output signals from the two photosensors are compared with each other, and the reference position of the scale is detected with excellent accuracy based on the levels of the output signals.

However, if a deviation of the scale or an inclination due to a slanting of the rotation shaft occurs in the rotating scale during its rotation, the detection timings for the reflected light by the two photodetectors shift in the same manner, as shown in FIG. 1, FIG. 2 and FIG. 3, and the reference position is misdetected.

In FIGS. 1 and 2, there is shown a laser diode 1, a collimating lens 2, a half-mirror 3, a cylindrical lens 4, a rotating scale 5, a mark 6 for detecting a reference position, a rotation shaft 7 of the rotating scale 5, and photosensors 8 and 9. Light from the laser diode 1 is made a parallel light by the collimating lens 2, and the parallel light is directed to the half-mirror 3. The parallel light reflected by the half-mirror 3 is converted into a linear light beam by the cylindrical lens 4, and a linear beam spot extended in the direction of the radius of the scale is formed on the scale 5. When the mark 6 passes through the linear spot, the light beam reflected by the mark 6 is directed to the photosensors 8 and 9 via the cylindrical lens 4 and the half-mirror 3.

The mark 6, the linear beam spot and the photosensors 8 and 9 are set so that levels of output signals A and B from the photosensors 8 and 9 coincide with each other only when the center line of the mark 6 and the center line of the linear beam spot coincide with each other, and detection of the reference position of the rotating scale 5 is performed according to a coincidence of output signals A and B from the photosensors 8 and 9. Now, if the rotating scale 5 shifts 0.5 μm in the direction of the X—X' axis which orthogonally crosses the rotation shaft of the scale and is displaced from the position indicated by the full line to the position indicated by the dotted line, as shown in FIG. 1, detection timings of the reflected light beam from the rectangular mark 6 on the rotating scale 5 by the photosensors 8 and 9 shift as shown in FIG. 3. That is, the timing $t_1$ at which levels of the output signals A and B of the photosensors 8 and 9 coincide with each other shifts to $t_1'$. Pulses depicted at an upper portion of FIG. 3 are reference (origin) signals corresponding to the reference position of the scale 5, produced according to a coincidence of levels of the output signals A and B. The reference signal is misdetected by the deviation of the scale 5.

The shift from the timing $t_1$ to the timing $t_1'$ corresponds to the shift of the reference position of the scale 5 by 0.5 μm along the circumferential direction of the scale 5. Hence, when the diameter of the scale 5 is 20 mm, an error of $\{\tan^{-1}(0.5/10000) \times 3600\} \simeq$ about 10 angular seconds is produced.

On the other hand, if the rotation shaft 7 of the scale 5 is slanted to tilt the scale 5 as shown in FIG. 2, the incident positions of the light beam reflected by the mark 6 on the photosensors 8 and 9 are shifted, and output timings of the output signals A and B from the photosensors 8 and 9 are shifted. For example, when a lens having a focal length $f=5$ mm is used as the cylindrical lens 4, the error in detecting the reference position becomes $\tan^{-1}\{5 \times \tan (1/60 \times 2)/10\} \times 60 = 20$ angular seconds, for the tilt of the rotation shaft 7 of 20 angular seconds.

In general, when a rotating scale is mounted to a small rotating mechanism using a bearing and the like, it is very difficult to prevent deviation of the shaft of 0.5 μm or less, or prevent slanting of the shaft of 10 angular seconds or less.

Accordingly, in conventional methods, it is difficult to exactly detect a reference position of a rotating scale.

SUMMARY OF THE INVENTION

It is an object of the present invention to solve the problems of the prior art.

It is another object of the present invention to provide a reference-position detection method and a reference-position detection apparatus always capable of exactly detecting a reference position of a rotating scale.

In accordance with one aspect of the invention, a reference-position detection method for detecting a reference position of a scale comprises the steps of (1) supplying the first and second patterns to the scale, (2) detecting the first pattern with a first detection sensor and detecting the second pattern with a second sensor, wherein the timings detected by the first and second sensors are different from each other, with the first and second patterns and the first and second sensors being arranged so that detection timings of the first and second patterns shift inversely to each other in response to a deviation in attitude of the scale from its predetermined attitude, and (3) determining the reference position of the scale according to the detection made in the detection step.

In accordance with another aspect of the invention, a reference-signal detection apparatus for detecting a reference position of a scale using first and second patterns provided on the scale comprises (1) first detection means for detecting the first pattern, and (2) second detection means for detecting the second pattern with a detection timing different than a detection timing of the first pattern detected by said first detection means, said first and second detection means being arranged so that detection timings of said first and second patterns shift inversely to each other in response to a deviation in attitude from a predetermined attitude of the scale, and wherein the reference position of the scale is determined in accordance with output signals of said first and second detection means.

In accordance with a further aspect of the invention, a reference-position method used in a rotary encoder for detecting a reference position of a rotating scale of the encoder comprises the steps of (1) supplying first and second patterns to the rotating scale so that a line connecting the patterns substantially passes through the center of said rotating scale, and one pattern is situated at a side opposite to another pattern relative to said center of rotation, (2) detecting the first pattern with a first sensor and the second pattern with a second sensor, with the detection timings of the first and second sensors being different from each other, said first and second sensors being arranged so that detection timings of the first and second patterns shift inversely to each other in response to a change in attitude of the rotating scale, and (3) determining the reference position of the rotating scale according to the detection made in the detection step.

In accordance with yet a further aspect of the invention, a reference-position detection apparatus used in a rotary encoder for detecting a reference position of a rotating scale using first and second patterns supplied to the rotating scale of the encoder so that the line connecting the patterns substantially passes through the center of rotation of the rotating scale, and one pattern is situated at a side opposite to another pattern relative to the center of rotation, comprises (1) illuminating means for illuminating the rotating scale by first and second radiant beams, said first and second radiant beams being directed to the scale so that the line connecting respective incident positions of the radiant beams on the rotating scale substantially passes through the center of rotation, and one of the radiant beams is incident on a side opposite to another radiant beam relative to the center of rotation, (2) a first sensor for receiving the first radiant beam reflected from the first pattern and for generating a first signal with a level which changes in accordance with a change in the relative position of the first pattern relative to the first radiant beam, and (3) a second sensor for receiving the second radiant beam reflected from the second pattern and for generating a second signal with a level which changes in accordance with a change in the relative position of the second pattern relative to the second radiant beam, said second signal being generated with a timing different from that of the first signal, and the reference position of the rotating scale being determined in accordance with levels of the first and second signals coinciding, and wherein the first and second sensors are provided so that generation timings of the first and second signals shift inversely to each other in response to a change in attitude of the rotating scale.

In a further aspect of the invention, a reference-position detection means for detecting a reference position of a scale comprises the steps of (1) supplying first and second patterns to the scale, (2) detecting the first pattern with a first sensor and generating a first signal, (3) detecting the second pattern with a second sensor and generating a second signal with the first and second patterns, the first and second sensors being arranged so that detection timings of the first and second patterns shift inversely to each other in response to a deviation in attitude of the scale from a predetermined attitude, and (4) determining the reference position of the scale in accordance with the first and second signals coinciding.

In yet another aspect of the present invention, a reference-position detection method for detecting a reference position of a scale using predetermined patterns formed on a scale comprises the steps of (1) generating first and second signals with respective predetermined timings by detecting the predetermined patterns, wherein the timings for generating the first and second signals shift inversely to each other in response to a change in attitude of the scale, and (2) determining the reference position according to the first and second signals.

In accordance with an additional aspect of the invention, a displacement measuring apparatus, such as an encoder, for generating an incremental signal by reading a gradation formed on a scale comprises detection means for detecting a pattern formed on the scale and generating a signal indicating a reference position of the scale, a displacement of the scale being monitored according to the signal and the incremental signal, and wherein said detection means is capable of compensating for a variation in the reference position as a result of a change in attitude of the scale.

The various features, concrete methods and configurations of the present invention will become more apparent from the embodiment to be described later.

DETAILED DESCRIPTION OF THE PREFERRED EMBODIMENT

Figure 4A:
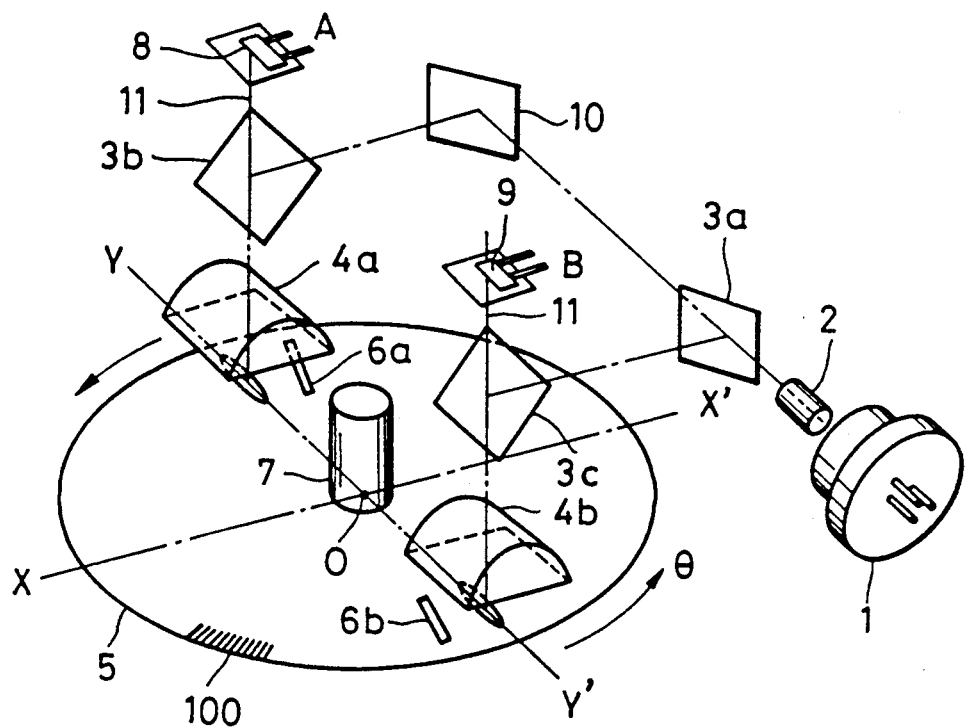
FIGS. 4A–4D are schematic diagrams showing an embodiment of the present invention.
Figure 4B:
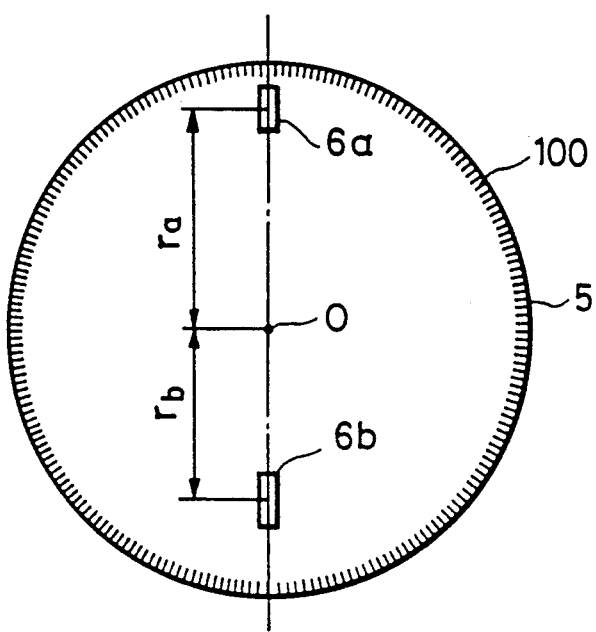
Figure 4C:
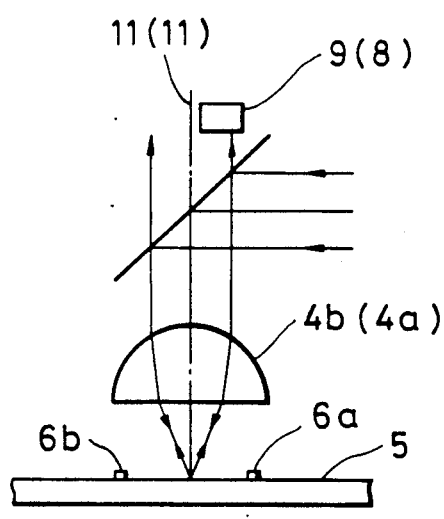
Figure 4D:
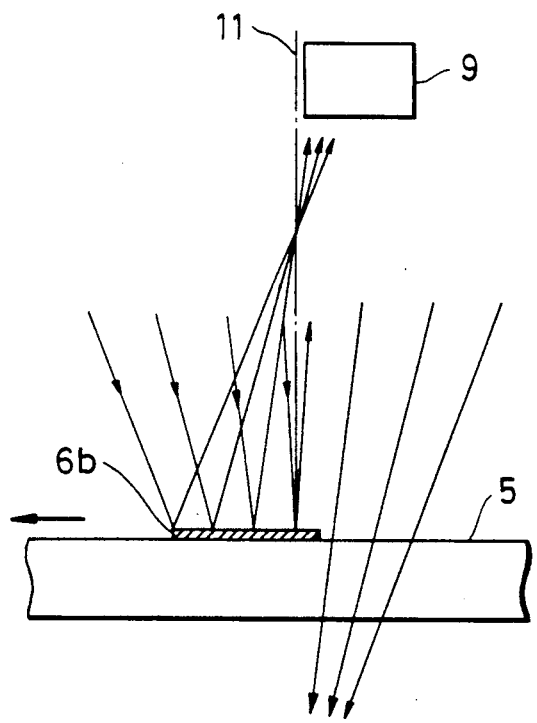

FIGS. 4A and 4B are schematic diagrams showing an embodiment of the present invention. FIG. 4A shows the configuration of an optical system, and FIG. 4B shows the arrangement of a mark pattern for detecting a reference position on a rotating scale. FIG. 4C is a partial schematic diagram which sees the optical system shown in FIG. 4A from the direction Y'—Y in FIG. 4A. FIG. 4D is an explanatory diagram showing the detection principle of the mark pattern by the optical system shown in FIG. 4A.

A laser diode is used for a light source 1 in this case. A collimating lens 2 makes the laser light beam from the light source 1 a parallel light beam. A beam splitter 3a divides the light beam from the collimating lens 2 into two light beams. There is also shown a reflecting mirror 10 and beam splitters 3b and 3c. A rotating scale 5, as an object to be detected, along the circumferential direction of which a diffraction grating 100 is formed, is rotated making the center O of a rotating shaft 7 the center of rotation.

Cylindrical lenses 4a and 4b, generatrices of which nearly coincide with the direction of the radius of the rotating scale 5, focus light beams from the beam splitters 3b and 3c in the circumferential direction (tangential direction) of the rotating scale 5, shape the beams into an elliptical shape extended in the direction of the radius of the rotating scale 5, and irradiate the beams perpendicularly on portions separated from each other on the rotating scale 5. Patterns 6a and 6b for detecting the reference (origin) position consist of rectangular reflecting films made of Al, Au or the like, and are disposed facing each other relative to the center O of rotation on a straight line passing through the center O of rotation of the rotating scale 5, as shown in FIG. 4B. The patterns 6a and 6b are provided so as to be located on radii (distances from the center O) $r_a$ and $r_b$, respectively. Photosensors 8 and 9 have photosensing members having an identical size, and receive the light beams reflected by the rectangular patterns 6a and 6b via the cylindrical lenses 4a and 4b and the beam splitters 3b and 3c, respectively. In the present embodiment, as shown in FIG. 4C the photosensors 8 and 9 are disposed by being shifted to the same side relative to the optical axis 11 of the cylindrical lenses 4a and 4b. The distances from the optical axis 11 to the centers of photosensors 8 and 9 are equal to each other. The cylindrical lenses 4a and 4b have the same focal length, and are diposed so that they form beam spots which have the same dimensions and shape on the rotating scale 5. The mark patterns 6a and 6b also have the same dimensions. The widths of the mark patterns 6a and 6b in the direction of their movements are set to about ½ of the widths of the beam spots. Accordingly, as shown in FIG. 4D, if the mark pattern 6b passes through, for example, the corresponding beam spot while moving from the right to the left in FIG. 4D, the amount of light incident upon the photosensor 9 gradually increases from the moment when the left-side edge of the mark pattern 6b passes through the optical axis 11, reaches the maximum value when the mark pattern 6b passes through a predetermined position, and subsequently decreases as the mark pattern 6b leaves the predetermined position.

In FIG. 4C, if the rotating scale 5 is rotating so that the mark pattern 6b moves from the right to the left in FIG. 4C near the optical axis 11, the mark pattern 6a moves from the left to the right in FIG. 4C near the optical axis 11. As described above, the light beam reflected from the mark pattern 6b starts being incident upon the photosensor 9 from the position where the mark pattern 6b verges on the optical axis 11. On the other hand, since the mark pattern 6a is situated at a side opposite to the mark pattern 6b relative to the center O of rotation of the rotating scale 5, the light beam reflected from the mark pattern 6a starts being incident upon the photosensor 8 from the moment when the mark pattern 6a is situated at a position separated from the optical axis 11. Accordingly, the detection timings of the mark patterns 6a and 6b by the photosensors 8 and 9 are shifted to each other, and the photosensor 8 starts generating a photoelectric conversion signal earlier than the photosensor 9 does.

Now, in FIG. 4D, if the rotating scale 5 is shifted, for example, to the left, the mark pattern 6b approaches the optical axis 11 although the rotating scale 5 have not rotated a predetermined amount. Hence, the timing for the light beam reflected from the mark pattern 6b to be incident upon the photosensor 9 is advanced. At this time, since the mark pattern 6a is shifted to a direction being separated from the optical axis 11, the timing for the light beam reflected from the mark pattern 6a to be incident upon the photosensor 8 is delayed. Accordingly, as will be described later, the detection timings of the mark patterns 6a and 6b by the photosensors 8 and 9 are shifted in reverse directions to each other. The situation is identical when the rotating scale 5 is tilted due to slanting of the rotation shaft 7.

Figure 5A:
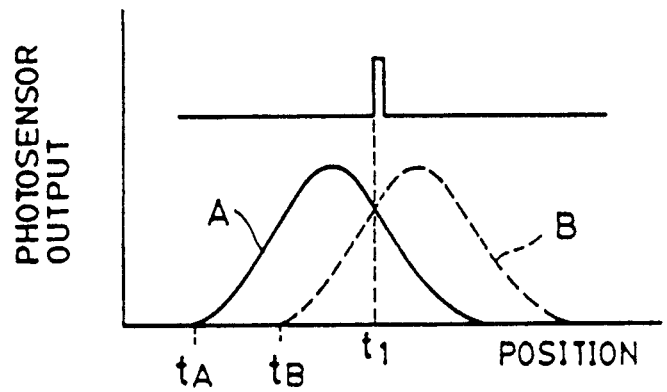
FIGS. 5A–5C are graphic diagrams for showing the effect according to the method of the present invention.

As described above, in the present embodiment, laser light beam from the light source 1 is made a nearly parallel light beam by the collimating lens 2, the light beam is directed to the cylindrical lenses 4a and 4b disposed at sides opposite to each other relative to the rotation shaft 7 via the beam splitters 3a, 3b and 3c and the mirror 10, and two elliptic beam spots are formed on portions separated from each other on the rotating scale 5 by the cylindrical lenses 4a and 4b. Photosensing timings (pattern detection timings) of respective reflected beams produced when the rectangular patterns 6a and 6b provided on the rotating scale 5 pass through respective beam spots by the photosensors 8 and 9 are shifted to each other. FIG. 5A is an explanatory diagram showing output signals A and B obtained from the two photosensors 8 and 9 at this time. The photosensor 8 starts detecting the pattern 6a from the time $t_A$, and the photosensor 9 starts detecting the pattern 6b at the time $t_B$. At this time, the time $t_1$ corresponding to the cross point (a point where levels of the two output signals coincide with each other) of the illustrated curves of the output signals A and B corresponds to the reference position (origin point) of the rotating scale 5.

The levels of output signals from the photosensors 8 and 9 change in accordance with the positional relationship between the beam spot on the scale 5 corresponding to the one photosensor 8 and the pattern 6a, and the positional relationship between the beam spot on the scale 5 corresponding to the other photosensor 9 and the pattern 6b.

Figure 1:
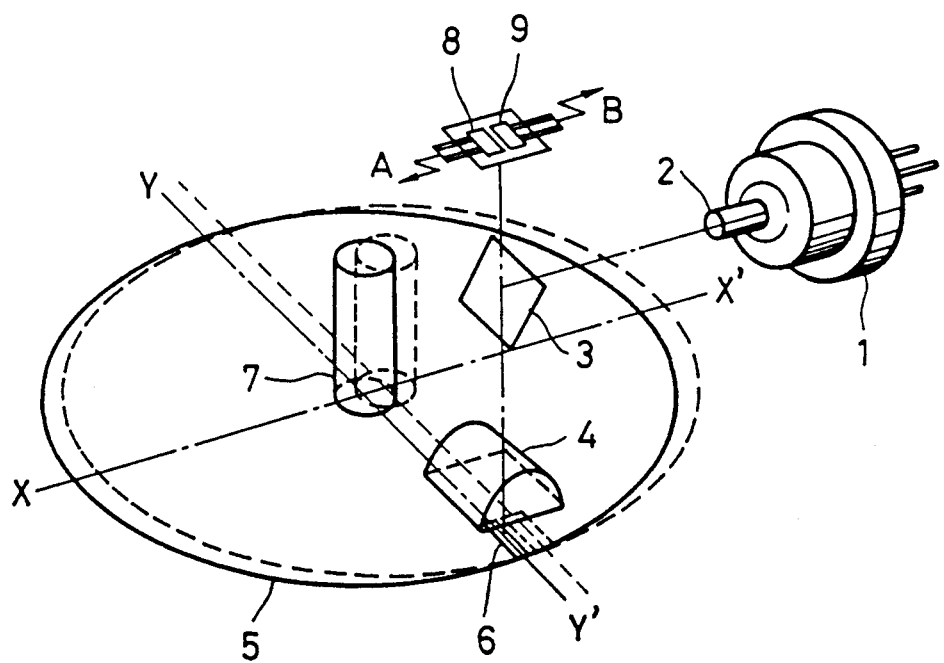
FIGS. 1 and 2 are explanatory diagrams showing a conventional method for detecting a reference position.
Figure 2:
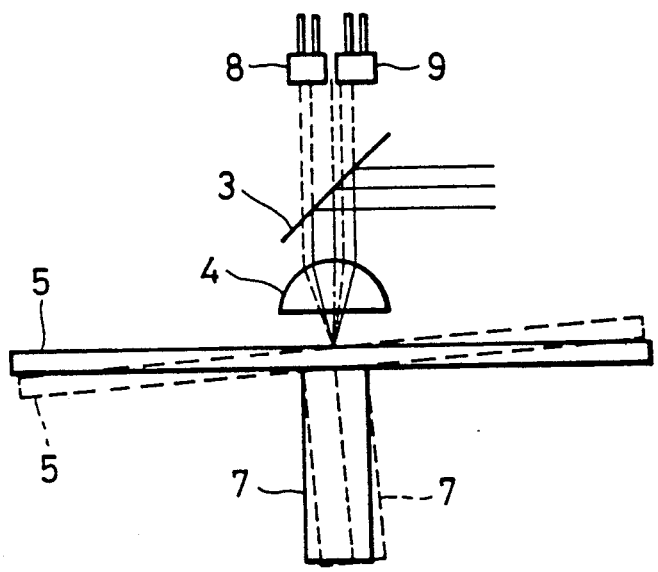
Figure 3:
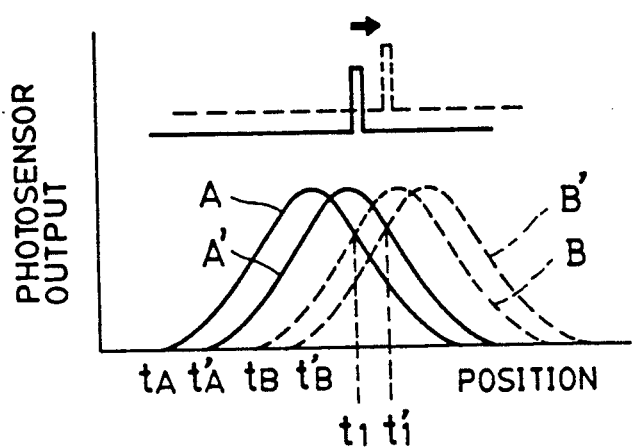
FIG. 3 is a graphic diagram for showing a problem in the conventional method for detecting a reference position.
Figure 5B:
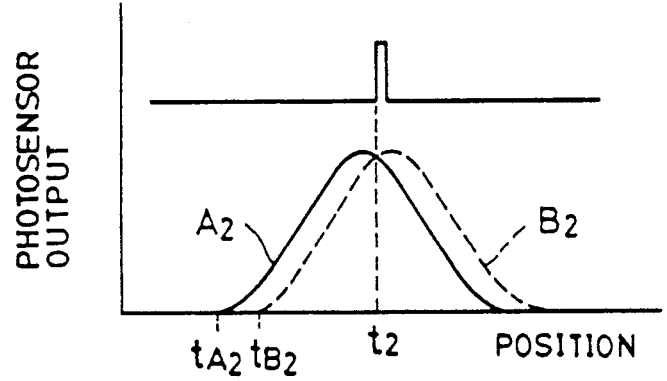

Now, if the center O of the rotating scale 5 is deviated in the direction of the X—X' axis as shown in FIG. 1, the photosensing timing of the photosensor 8 delays to produce the signal $A_2$ as shown in FIG. 5B. On the contrary, the photosensing timing of the photosensor 9 advances to produce the signal $B_2$. As a result, respective signal outputs as shown in FIG. 5B can be obtained. At this time, the time $t_2$ corresponding to the cross point of the output signals $A_2$ and $B_2$ becomes identical to the time $t_1$ in FIG. 5A.

Figure 5C:
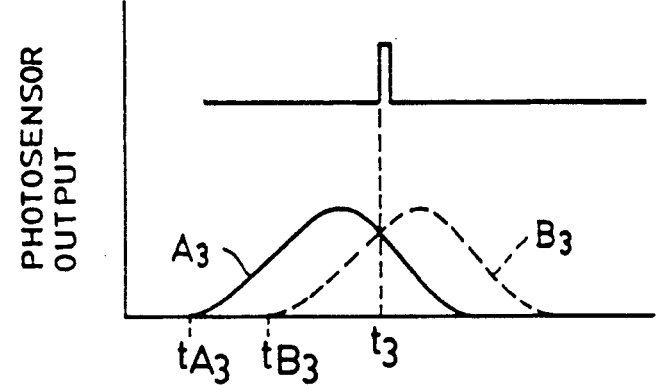

Similarly, when slanting of the rotation shaft 7 such that the rotating scale 5 rotates around the Y—Y' axis occurs, the photosensing timing of the photosensor 8 delays to become the time $t_{A3}$, but the photosensing timing of the photosensor 9 advances to become the time $t_{B3}$, as shown in FIG. 5C. As a result, the time $t_3$ corresponding to the cross point of the signal outputs $A_3$ and $B_3$ becomes identical to the time $t_1$ in FIG. 5A.

That is, in any case, the time corresponding to the cross point of the signals A and B from the photosensors 8 and 9 does not change.

Particularly, in the present embodiment, a light beam from the single light source 1 is divided into two light beams, which are directed to respective detection systems (3c, 4b, 6b and 9: 3b, 4a, 6a and 8). Hence, the present embodiment has the feature that if the light emission intensity of the light source 1 changes, the detection timing never shifts as shown in FIG. 5C.

As described above, in the present embodiment, by separately providing the rectangular patterns 6a and 6b at predetermined positions on the line passing through the center O of rotation on the rotating scale 5 and disposing the two photosensors 8 and 9 with being shifted to each other at the same side from the optical axis 11 of the cylindrical lenses 4a and 4b, an error produced when detecting the reference position (origin position) is removed using output signals obtained from the two photosensors 8 and 9 even if the rotating scale is displaced from a normal state (position), and hence highly accurate detection becomes possible. Although, in the present embodiment, the positions of the photosensors 8 and 9 are shifted from the optical axis 11, the photosensors 8 and 9 may be disposed so that their centers coincide with the optical axis 11, and the patterns 6a and 6b may be formed at positions shifted by a predetermined amount to each other at the same side relative to a line passing through the center O of rotation.

In the present embodiment, the distances from the center O of rotation of the two rectangular patterns 6a and 6b are slightly changed from each other for the purpose of obtaining one reference-position signal for every rotation of the rotating scale 5. The patterns 6a and 6b are disposed so that the reflected light beams from the patterns 6a and 6b are received only by separate photosensors 8 and 9, respectively.

The diffraction grating 100 formed on the rotating scale 5 is a gradation scale for detecting the amount of rotation of the rotating scale 5, and is read by a scale-reading apparatus (not illustrated). Signals from the photosensors 8 and 9 are also input to a processing circuit within this apparatus. In this circuit, a reference signal corresponding to the reference position of the rotating scale 5 is generated according to the coincidence of levels of the respective signals. According to the reference signal, an absolute signal indicating the absolute position of the rotating scale can be formed from an incremental signal obtained by reading the diffraction grating 100.

Reading of the diffraction grating 100 is performed by irradiating a laser beam on the diffraction grating 100, having + 1st-order diffraction light beams generated by the diffraction grating 100 interfere with each other, and performing photoelectric conversion of an interference light formed by the interference. By the photoelectric conversion, pulses are sequentially generated in accordance with the displacement (rotation) of the diffraction grating 100, and incremental signals are provided. Since the configuration of a scale-reading apparatus which performs such a reading is shown, for example, in the above-described Japanese Patent Public Disclosure (Kokai) No. 62-200223 (1987), a detailed explanation thereof will be omitted in the present application.

An incremental encoder provided with a scale and a reading apparatus of this kind performs displacement measurement with an extremely high resolution. The reference-position detection method and apparatus according to the present invention can sufficiently exhibit their performances even when used in such an encoder.

Although, in the embodiment shown in FIGS. 4A and 4B, the patterns for detecting the reference position are reflective patterns formed by reflective films made of Al, Au or the like, transparent patterns the circumferences of which are surrounded by reflective films or light-absorbing films may be provided. Furthermore, the shape of the patterns is not limited to a rectangular shape, but the patterns may have various shapes, such as a circular shape and the like. Three-dimensional marks may also be provided.

Moreover, magnetized patterns which are magnetized in a predetermined direction may also be used with other optical patterns of this kind. Detection of the magnetized patterns may be performed by a magnetic sensor. In addition, the scale as an object is not limited to an optical scale as shown in FIGS. 4A and 4B. Accordingly, for the gradation scale, a magnetic scale as well as an optical scale having many aligned slits may be used, as well as not using a diffraction grating at all.

As described above, the present invention may be practiced in various forms, and is not limited to the aspects illustrated in the present embodiment.

We claim:

1. A reference-position detection method for detecting a reference position of a scale comprising the steps of:

supplying first and second patterns to the scale;

detecting the first pattern with a first detection sensor and detecting the second pattern with a second sensor, wherein the timings detected by the first and second sensors are different from each other, with the first and second patterns and the first and second sensors being arranged so that detection timings of the first and second patterns shift inversely to each other in response to a deviation in attitude of the scale from its predetermined attitude; and determining the reference position of the scale according to the detection made in the detection step.

2. A reference-position detection method according to claim 1, wherein the detection step further comprises the steps of directing a radiant beam to the scale, receiving a reflected beam from the first pattern by the first sensor, and receiving a reflected beam from the second pattern by the second sensor.

3. A reference-position detection method according to claim 2, wherein the directing step comprises the steps of dividing a laser beam from a predetermined laser into first and second beams, and irradiating the first and second beams on portions of the scale which are different from each other, and wherein the directing step is performed so that the first and second patterns are detected by the first and second beams, respectively.

4. A reference-position detection method according to claim 1, wherein said detection step further comprises the steps of outputting a first signal with a level which changes in accordance with a change in the relative position between the first sensor and the first pattern, and outputting a second signal with a level which changes in accordance with a change in the relative position between the second sensor and the second pattern.

5. A reference-signal detection method according to claim 4, wherein said determining step comprises the steps of detecting when the level of the first signal and the level of said second signal coincide, and outputting a signal indicating the reference position according to the coincidence of the first and second signal levels.

6. A reference-signal detection apparatus for detecting a reference position of a scale using first and second patterns provided on said scale comprising:
first detection means for detecting the first pattern; and
second detection means for detecting the second pattern with a detection timing different than a detection timing of the first pattern detected by said first detection means; said first and second detection means being arranged so that detection timings of said first and second patterns shift inversely to each other in response to a deviation in attitude from a predetermined attitude of the scale, wherein the reference position of the scale is determined in accordance with output signals of said first and second detection means.

7. A reference-position detection apparatus according to claim 6, wherein said first detection means comprises a first projecting system for directing a first radiant beam to the scale, and a first sensor for receiving the first radiant beam after it is reflected by the first pattern and outputting a first signal with a level which changes in accordance with a change in the relative position between the first pattern and the first radiant beam, and said second detection means comprises a second projecting system for directing a second radiant beam to the scale, and a second sensor for receiving the second radiant beam after it is reflected by the second pattern and outputting a second signal with a level which changes in accordance with a change in the relative position between the second pattern and the second radiant beam.

8. A reference-position detection apparatus according to claim 7, wherein said first and second detection means comprise a common laser and beam splitter, and a laser beam from said laser is divided by said beam splitter to produce said first and second radiant beams.

9. A reference-position detection apparatus according to claim 8, wherein said first and second projecting systems include respective cylindrical lenses, and said first and second radiant beams are projected through said cylindrical lenses and form linear beam spots on the scale.

10. A reference-position detection apparatus according to claim 7, wherein a reference position signal is generated when the levels of said first and second signals coincide.

11. A reference-position detection method used in a rotary encoder for detecting a reference position of a rotating scale of the encoder comprising the steps of:
supplying first and second patterns to the rotating scale so that the line connecting the patterns substantially passes through the center of said rotating scale, and one pattern is situated at a side opposite to another pattern relative to said center of rotation;
detecting the first pattern with a first sensor and the second pattern with a second sensor, with the detection timings of the first and second sensors being different from each other, said first and second sensors being arranged so that detection timings of the first and second patterns shift inversely to each other in response to a change in attitude of the rotating scale; and
determining the reference position of the rotating scale according to the detection made in said detection step.

12. A reference-position detection method according to claim 11, wherein said first and second patterns are not equidistant from the center of the rotating scale.

13. A reference-position detection method according to claim 12, wherein the first and second patterns are marks each extended in the direction of the radius of the rotating scale.

14. A reference-position detection method according to claim 13, wherein the marks are reflective films.

15. A reference-position detection method according to claim 14, wherein the detection step comprises the steps of irradiating first and second radiant beams on the rotating scale so that the line connecting respective incident positions of the radiant beams substantially passes through the center of rotation of the rotating scale, and one radiant beam is incident on a side opposite to another radiant beam relative to said center of rotation, receiving a reflected beam produced by the reflection of the first radiant beam from the first pattern and generating a first signal with a level which changes in accordance with a change in the relative position of the first pattern relative to the first radiant beam, and receiving a reflected beam produced by the reflection of the second radiant beam by the second pattern and generating a second signal with a level which changes in accordance with a change in the relative position of the second pattern relative to the second radiant beam.

16. A reference-position detection method according to claim 15, wherein the irradiated first and second radiant beams form linear beam spots on the scale extending in the direction of the radius of the rotating scale.

17. A reference-position detection method according to claim 16, wherein the irradiating step divides a laser beam emitted from a laser to produce the first and second radiant beams.

18. A reference-position detection method according to claim 15, wherein the determining step generates a signal indicating the reference position when the levels of the first and second signals coincide.

19. A reference-position detection method according to claim 18, wherein the sigal indicating the reference position and an incremental signal formed by reading of a gradation of the rotating scale by the encoder are used to measure a displacement of the rotating scale.

20. A reference-position detection apparatus used in a rotary encoder for detecting a reference position of a rotating scale using first and second patterns supplied to the rotating scale of the encoder so that a line connecting the patterns substantially passes through the center of rotation of the rotating scale, and one pattern is situated at a side opposite to another pattern relative to the center of rotation, said apparatus comprising:
illuminating means for illuminating the rotating scale by first and second radiant beams; said first and second radiant beams being directed to the scale so that the line connecting respective incident positions of the radiant beams on the rotating scale substantially passes through the center of rotation, and one of the radiant beams is incident on a side opposite to another radiant beam relative to the center of rotation;
a first sensor for receiving the first radiant beam reflected from the first pattern and generating a first signal with a level which changes in accordance with a change in the relative position of the first pattern relative to the first radiant beam; and a second sensor for receiving the second radiant beam reflected from the second pattern and generating a second signal with a level which changes in accordance with a change in the relative position of the second pattern relative to the second radiant beam; said second signal being generated with a timing different from that of the first signal, and the reference position of the rotating scale being determined in accordance with the levels of the first and second signals coinciding, wherein the first and second sensors are provided so that generation timings of the first and second signals shift inversely to each other in response to a change in attitude of the rotating scale.

21. A reference-position detection apparatus according to claim 20, wherein said illuminating means comprises a laser, a beam splitter for dividing a laser beam from said laser into said first and second radiant beams, a first projecting system for receiving the first radiant beam from said beam splitter and directing the beam to the rotating scale, and a second projecting system for receiving the second radiant beam from said beam splitter and directing the beam to the rotating scale.

22. A reference-position detection apparatus according to claim 21, wherein said first sensor receives a beam reflected from the first pattern and generates said first signal, and said second sensor receives a beam reflected from the second pattern and generates said second signal.

23. A reference-position detection apparatus according to claim 21, wherein the first and second light-projecting systems comprise respective cylindrical lenses having generatrices which are substantially directed along the radius of the rotating scale, and the first and second radiant beams projected through said cylindrical lenses form linear beam spots on the rotating scale.

24. A reference-position detection method for detecting a reference position of a scale comprising the steps of:

supplying first and second patterns to the scale;

detecting the first pattern with a first sensor and generating a first signal;

detecting the second pattern with a second sensor and generating a second signal; with the first and second patterns and first and second sensors being arranged so that detection timings of the first and second patterns shift inversely to each other in response to a deviation in attitude of the scale from a predetermined attitude; and determining the reference position of the scale in accordance with the first and second signals coinciding.

25. A reference-position detection method for detecting a reference position of a scale using predetermined patterns formed on the scale comprising the steps of:

generating first and second signals with respective predetermined timings by detecting the predetermined patterns, wherein the timings for generating the first and second signals shift inversely to each other in response to a change in attitude of the scale; and determining the reference position according to the first and second signals.

26. A reference-position detection method according to claim 25, wherein the predetermined patterns include first and second marks provided at positions separated from each other on the scale, and the generating step generates the first signal according to detection of the first mark and the second signal according to the detection of the second mark.

27. A reference-position detection method according to claim 26, wherein said determining step generates a signal indicating the reference position in accordance with the first and second signals coinciding.

28. A displacement measuring apparatus, such as an encoder, for generating an incremental signal by reading a gradation formed on a scale, comprising:

detection means for detecting patterns formed on the scale and generating a signal indicating a reference position of the scale, a displacement of the scale being monitored according to the signal and the incremental signal, said detection means being capable of compensating for a variation in the reference position as a result of a change in attitude of the scale.

29. A displacement measuring apparatus according to claim 28, wherein said scale is a rotating scale, and the patterns include first and second marks formed at positions separated from each other on the rotating scale, and wherein said detection means photoelectrically detects said first and second marks and generates the reference-position signal according to a signal corresponding to each mark thereby obtained.

30. A displacement measuring apparatus according to claim 29, wherein said detection means is configured so that detection timings of said respective marks shift inversely to each other in response to the change in attitude.

* * * * *

UNITED STATES PATENT AND TRADEMARK OFFICE
CERTIFICATE OF CORRECTION

PATENT NO. : 5,026,985

DATED : June 25, 1991

INVENTOR(S) : Koh Ishizuka, et al.

It is certified that error appears in the above-identified patent and that said Letters Patent is hereby corrected as shown below:

COLUMN 9:

Line 56, "the" (first occurrence) should read --a-- and "substa-" should read --substan--.

Line 57, "said" should read --the--.

COLUMN 10:

Line 45, "sigal" should read --signal--.

Signed and Sealed this

Sixteenth Day of February, 1993

*Attest:*

STEPHEN G. KUNIN

*Attesting Officer*     *Acting Commissioner of Patents and Trademarks*